(12) United States Patent
Ha

(10) Patent No.: US 12,423,901 B2
(45) Date of Patent: Sep. 23, 2025

(54) METHOD AND APPARATUS WITH IMAGE RENDERING BASED ON TILES

(71) Applicant: SAMSUNG ELECTRONICS CO., LTD., Suwon-si (KR)

(72) Inventor: Inwoo Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 345 days.

(21) Appl. No.: 18/085,159

(22) Filed: Dec. 20, 2022

(65) Prior Publication Data

US 2023/0368456 A1 Nov. 16, 2023

(30) Foreign Application Priority Data

May 11, 2022 (KR) .................. 10-2022-0057589

(51) Int. Cl.
*G06T 15/00* (2011.01)
*G06T 1/20* (2006.01)
*G06T 15/80* (2011.01)

(52) U.S. Cl.
CPC .............. *G06T 15/005* (2013.01); *G06T 1/20* (2013.01); *G06T 15/80* (2013.01)

(58) Field of Classification Search
None
See application file for complete search history.

(56) References Cited

U.S. PATENT DOCUMENTS

| 2021/0183002 | A1* | 6/2021 | Sharma ..................... G06T 1/20 |
| 2021/0294945 | A1 | 9/2021 | Müller et al. |
| 2021/0397957 | A1 | 12/2021 | Vaishampayan et al. |
| 2023/0195519 | A1* | 6/2023 | Krishnan .............. G06F 1/3243 713/320 |

FOREIGN PATENT DOCUMENTS

KR 10-2020-0075185 A 6/2020
KR 10-2021-0075007 A 6/2021

OTHER PUBLICATIONS

Mildenhall, Ben, et al. "Nerf: Representing scenes as neural radiance fields for view synthesis." *Communications of the ACM* 65.1 (2021): pp. 99-106.
Reiser, Christian, et al. "Kilonerf: Speeding up neural radiance fields with thousands of tiny mlps." *Proceedings of the IEEE/CVF International Conference on Computer Vision*. 2021. pp. 1-11.

* cited by examiner

*Primary Examiner* — Michael J Cobb
(74) *Attorney, Agent, or Firm* — NSIP Law

(57) ABSTRACT

A method and an apparatus with image rendering are provided. A method includes generating a first-rendering result corresponding to input graphic data of a rendering target, wherein the first-rendering result is rendered in units of first tiles by performing first-rendering including a first type of operation using a first processing unit, storing, in memory, the first-rendering result as units of first tiles, generating a second-rendering result of second tiles by, for each first tile of the first-rendering result, performing second-rendering including a second type of operation using a second processing unit, storing, in the memory, the second-rendering result as units of second tiles, and determining a final rendering result based on the second-rendering result.

20 Claims, 9 Drawing Sheets

METHOD AND APPARATUS WITH IMAGE RENDERING BASED ON TILES

CROSS-REFERENCE TO RELATED APPLICATIONS

This application claims the benefit under 35 USC § 119(a) of Korean Patent Application No. 10-2022-0057589, filed on May 11, 2022, in the Korean Intellectual Property Office, the entire disclosure of which is incorporated herein by reference for all purposes.

BACKGROUND

1. Field

The following description relates to a method and an apparatus with image rendering.

2. Description of Related Art

A graphic processing unit (GPU) is a processing unit specialized in graphics processing. Image rendering is a form of graphics processing where scene data (e.g., a three-dimensional model) of an object is converted into image frame data for display. Image rendering may require complicated and massive computation. For example, image rendering may include numerous vector space conversions, such as a shader operation, a texture operation, and pixel rendering. A GPU has a structure suitable for such image rendering. Recently, with the development of artificial intelligence (AI) technology, AI technology is also being applied to graphic processing. Numerous matrix convolution operations are required for AI inference or training. A neural processing unit (NPU) may have a structure specialized in such a matrix convolution operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes generating a first-rendering result corresponding to input graphic data of a rendering target, wherein the first-rendering result is rendered in units of first tiles by performing first-rendering including a first type of operation using a first processing unit, storing, in memory, the first-rendering result as units of first tiles, generating a second-rendering result of second tiles by, for each first tile of the first-rendering result, performing second-rendering including a second type of operation using a second processing unit, storing, in the memory, the second-rendering result as units of second tiles, and determining a final rendering result based on the second-rendering result.

The first type of operation may include a scalar operation or a vector operation, and the second type of operation may include a matrix operation.

The first processing unit may have a structure configured to implement the first type of operation, and the second processing unit may have a structure configured to implement the second type of operation.

Prior to the second-rendering using the second processing unit, there may be a reordering of a first processing schedule for performing the first type of operation to a second processing schedule for performing the second type of the operation.

The first processing unit may be a graphic processing unit (GPU), the second processing unit may be a neural processing unit (NPU), the first processing schedule may be a schedule based on image pixel locations, and the second processing schedule may be based on one or more weights of a neural network implemented by the NPU.

The first-rendering may include geometry-buffer rendering that converts the input graphic data into the first tiles based on vertices of the input graphic data, and deferred rendering that performs shading for each first tile of the first-rendering result, wherein the second-rendering may include super-resolution imaging that increases the resolution of the first tiles of the first-rendering result.

A third-rendering result may be generated for each second tile of the second-rendering result by performing third-rendering comprising the first type of operation using the first processing unit, and storing the third-rendering result in the memory, wherein determining the final rendering result may be further based on the third-rendering result.

The first-rendering may include geometry buffer rendering that converts the input graphic data into the first-rendering result of first tile units based on vertices of the input graphic data, wherein the second-rendering may include neural shading that performs shading for each first tile of the first-rendering result using a neural network model, and the third-rendering may include deferred rendering that performs shading for each second tile of the second-rendering result.

The generation of the first-rendering result, the storing the first tile units of the first-rendering result in the memory, and the generating of the second-rendering result for each first tile of the first-rendering result may be performed through a pipeline, and a portion of the second-rendering result corresponding to a sub-area of the input graphic data may be generated before the first rendering result corresponding to the entire area of the input graphic data may have been generated.

A second of the first tiles may be generated by the first processing unit when a first of the first tiles may be completed being generated by the first processing unit, while the first of the first tiles may be stored in the memory or the second-rendering result for the first of the first tiles may be generated by the second processing unit.

An indication of an is-available status of the first of the first tiles may be received by the second processing unit when the storage of the first of the first tiles in the memory may be completed, and wherein the is-available status of the first of the first tiles may be received through either a transmission of a notification signal for the second processing unit or a change of a flag indicating the is-available status of the first of the first tiles.

An indication of an is-available status of the second-rendering result for the first of the first tiles may be received by the first processing unit when a generation of the second-rendering result for the first of the first tiles may be completed by the second processing unit and when a storage of the second-rendering result for the first of the first tiles in the memory may be completed, and wherein the is-available status of the second-rendering result for the first of the first tiles may be received through either a transmission of a notification signal for the first processing unit or a change of a flag indicating the is-available status of the second-rendering result for the first of the first tiles.

In one general aspect, an apparatus includes a first processor configured to generate a first-rendering result corresponding to input graphic data of a rendering object, wherein the first-rendering result includes first tiles and is generated by performing first-rendering that includes a first type of operation, and the first processor is further configured to store the first tiles in memory, a second processor is configured to generate a second-rendering result further includes second tiles for the respective first tiles of the first-rendering result by performing second-rendering that includes a second type of operation, and wherein the second processor is further configured to store the second tiles in the memory, the first type of operation includes a scalar operation or a vector operation, and the second type of operation includes a matrix operation.

The apparatus may include a pipeline that may include the first processor and the second processor, wherein the generation of the first-rendering result, the storage of the first tiles in the memory, and the generation of the second rendering result may be performed through the pipeline, and wherein a portion of the second-rendering result corresponding to a sub-area of the input graphic data may be generated before the first-rendering result corresponding to the entire area of the input graphic data may be generated.

A first rendering order for performing the first type of operation may be reordered to a second rendering order for performing the second type of operation, wherein the reordering may be performed prior to the second-rendering by the second processor.

In one general aspect, a mobile device includes a first processor configured to perform tile-based rendering to generate a first-rendering result corresponding to input graphic data of a rendering target, the first-rendering result includes first tiles, the first-rendering includes a first type of operation, and the first tiles are stored in memory, a second processor is configured to generate a second-rendering result that includes second tiles respectively corresponding to the first tiles by performing, on the first tiles, second-rendering includes a second type of operation, the second tiles are stored in the memory, an output device is configured to display a final rendering result according to the second-rendering result, the first type of operation includes a scalar operation or a vector operation, and the second type of operation includes a matrix operation.

The first tiles and second tiles may be generated through a pipeline such that a first tile may be being generated while a second tile is being generated, and wherein a portion of the second tiles that correspond to a sub-area of the input graphic data may be generated before all of the first-rendering result corresponding to the entire area of the input graphic data may be generated.

Generation of a second of the first tiles may be performed by the first processor when generation of a corresponding first of the first tiles may be completed, while the first of the first tiles may be stored in the memory or a corresponding one of the second tiles may be generated by the second processor.

A first processing schedule specific to the first type of operation may be reordered to a second processing schedule specific to the second type of operation before the second-rendering by the second processor.

In one general aspect, a method includes rendering an input model that includes three-dimensional vertices, the rendering is performed by a graphics processing unit (GPU) generating first tiles, while at least some of the first tiles are being rendered by the GPU, rendering, by a neural processing unit (NPU), other of the first tiles to generate second tiles respectively corresponding to the first tiles, and generating an image of the input model based on the second tiles.

The NPU may include a neural network that renders the second tiles from the first tiles.

A full set of the first tiles that correspond to all of the image may be rendered, a subset of the first tiles may be selected for rendering by the NPU, and a correspondingly non-selected subset of the first tiles may not rendered by the NPU.

The subset of the first tiles may be selected based on a feature of a corresponding portion of the input model.

The image may be generated based further on the non-selected subset of the first tiles.

The rendering by the NPU may include super-resolution rendering such that the second tiles have higher resolution than the first tiles.

A non-transitory computer-readable storage medium may store instructions that, when executed by a processor, cause the processor to perform any of the methods.

Other features and aspects will be apparent from the following detailed description, the drawings, and the claims.

DETAILED DESCRIPTION

Figure 1:
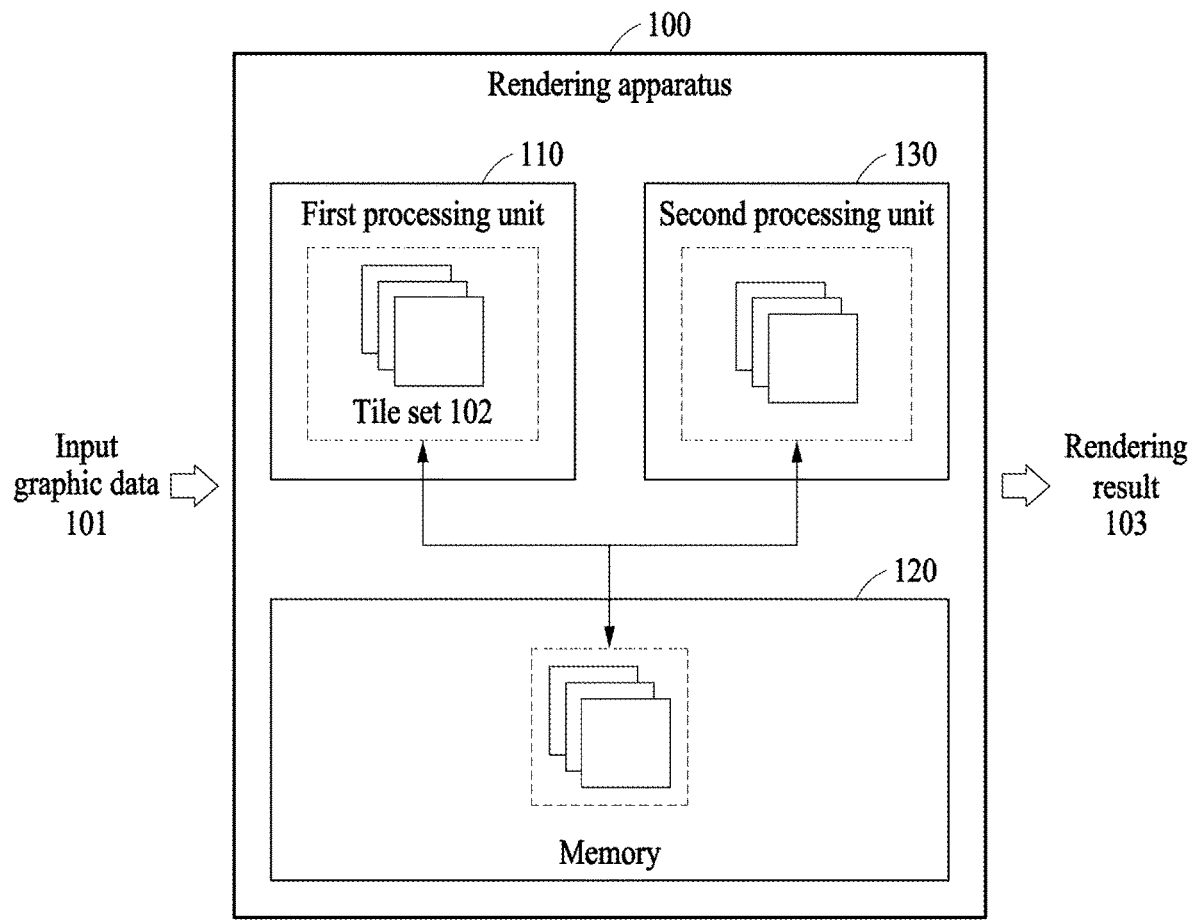
FIG. 1 illustrates a structure and operation of a rendering apparatus, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like or similar components and a repeated description related thereto is omitted.

FIG. 1 illustrates a structure and operation of a rendering apparatus, according to one or more embodiments. Referring to FIG. 1, a rendering apparatus 100 may generate a final-rendering result 103 corresponding to input graphic data 101. The input graphic data 101 may correspond to two-dimensional or three-dimensional data corresponding to an object and/or a scene of a rendering target (e.g., three-dimensional model data including, e.g., a mesh, textures, and/or the like). The input graphic data 101 may include color data, depth data, normal data, and the like. The final-rendering result 103 may be an image frame for display.

A procedure in which the final-rendering result 103 is derived based on the input graphic data 101 will be referred to as a rendering process. The rendering process may include various operations. For example, the rendering process may include a first type of operation that may be a scalar operation and/or a vector operation, and a second type of operation that may be a matrix operation. The matrix operation may be a tensor operation or a neural network operation. For example, the matrix operation may include a convolution operation.

The rendering apparatus 100 may include a first processing unit 110, memory 120, and a second processing unit 130. In consideration of characteristics of each of the first processing unit 110 and the second processing unit 130, the rendering apparatus 100 may perform a certain part of the rendering process through the first processing unit 110 and another certain part of the rendering process may be performed through the second processing unit 130. For example, the first processing unit 110 may have a structure (e.g., circuitry) specialized in the first type of operation, and the second processing unit 130 may have a structure specialized in the second type of operation. In this case, the rendering apparatus 100 may perform the first type of operation (among the operations of the rendering process) through the first processing unit 110, and the second type of operation through the second processing unit 130. According to an example embodiment, the first processing unit 110 may include a graphic processing unit (GPU) and/or a ray processing unit (RPU), and the second processing unit 130 may include a neural processing unit (NPU) (as used herein, "GPU" is used to refer to a non-RPU GPU, an RPU, and/or a GPU with an RPU). Hereinafter, an example embodiment in which the first processing unit 110 may correspond to the GPU and the second processing unit 130 may correspond to the NPU will be described, however, this is one example embodiment and other types of processing units may be used instead of the GPU and/or the NPU.

The rendering apparatus 100 may perform tile-based rendering. Tile-based rendering may be distinguished from immediate-mode rendering where the entire frame buffer is updated once per draw call. Tile-based rendering performs rendering in units of tiles, which may be stored in tile buffers. Tile-based rendering may reduce power consumption through less use of memory space and less memory bandwidth. In addition, as the processing unit of a tile is smaller than a frame, relative to immediate-mode rendering, latency between the processing units decreases, thereby shortening the total time for which the final rendering result 103 may be derived from the input graphic data 101.

The rendering apparatus 100 may generate a first-rendering result in units of tiles (first tiles) corresponding to input graphic data 101 by performing first-rendering with a first type of operation using the first processing unit 110. The first-rendering result may include a tile set 102 (first tiles). When the input graphic data 101 corresponds to various graphic representations, a tile set 102 corresponding to each respective graphic representation may be generated. For example, when the input graphic data 101 includes graphic representations such as color data, depth data (e.g., model data), and normal data, a tile set 102 corresponding to each of them may be generated. The tile set 102 may include a plurality of tiles.

The rendering apparatus 100 may store the first-rendering result in the memory 120 in units of tiles. The memory 120 may be memory external to the first processing unit 110 and the second processing unit 130. According to an example embodiment, the memory 120 may include shared cache memory and/or system memory. Hereinafter, the memory 120 is described, as an example embodiment, as system memory, but another type of memory such as the shared cache memory may be used instead of the system memory. The rendering process may include several orders of sub-stages. Hereinafter, examples of the rendering process that include the first-rendering and the second-rendering, or that include a third-rendering are described. However, substages of the rendering process are not limited thereto.

The rendering apparatus 100 may generate a second-rendering (second tile) result for each respective tile of a first-rendering result by performing second-rendering with the second type of operation using the second processing unit 130, and may store the second-rendering result in the memory 120 in units of tiles (second tiles). The final rendering result 103 (a final version) based on the second-rendering result may be generated. To distinguish it from the final rendering result 103, the first-rendering result or the like may also be referred to as an intermediate rendering result.

According to an example embodiment, the rendering process may include the first-rendering and the second-rendering. For example, the first-rendering may include (i) a geometry buffer rendering that converts input graphic data into the first-rendering result (in units of tiles) based on vertices of the input graphic data and (ii) a deferred rendering that performs shading for each tile of the first-rendering result. The second-rendering may include super-resolution imaging that increases the resolution of the first-rendering result.

According to another example embodiment, the rendering process may include the first-rendering, the second-rendering, and the third-rendering. In this case, the rendering apparatus 100 may read the second-rendering result (in units of tiles) using the first processing unit 110 and store the same in internal memory of the first processing unit 110, generate the third-rendering result for each tile of the second-rendering result by performing the third-rendering based on the first type of operation using the first processing unit 110, and store the third-rendering result in the system memory. In this case, the final rendering result 103 may be determined based on the third-rendering result.

According to an example embodiment, the first-rendering may include the geometry buffer rendering that converts input graphic data into the first-rendering result of units of tiles based on the vertices of the input graphic data, the second-rendering may include neural shading that performs shading for each tile of the first rendering result using a neural network model, and the third-rendering may include the deferred rendering that performs shading for each tile of the second-rendering result.

The rendering apparatus 100 may include an interface capable of transferring data of units of tiles between the first processing unit 110, the memory 120, and the second processing unit 130. For example, a tile transfer interface may be provided between the first processing unit 110 and the memory 120 and between the second processing unit 130 and the memory 120, respectively. Through this interface, the rendering result of each stage (e.g., pipeline stage) may be transferred in units of tiles. The bandwidth of the tile transfer interface may be determined based on the tile size. For example, the bandwidth of the tile transfer interface may be narrower than the interface for transmitting data of units of frames.

Figure 2:
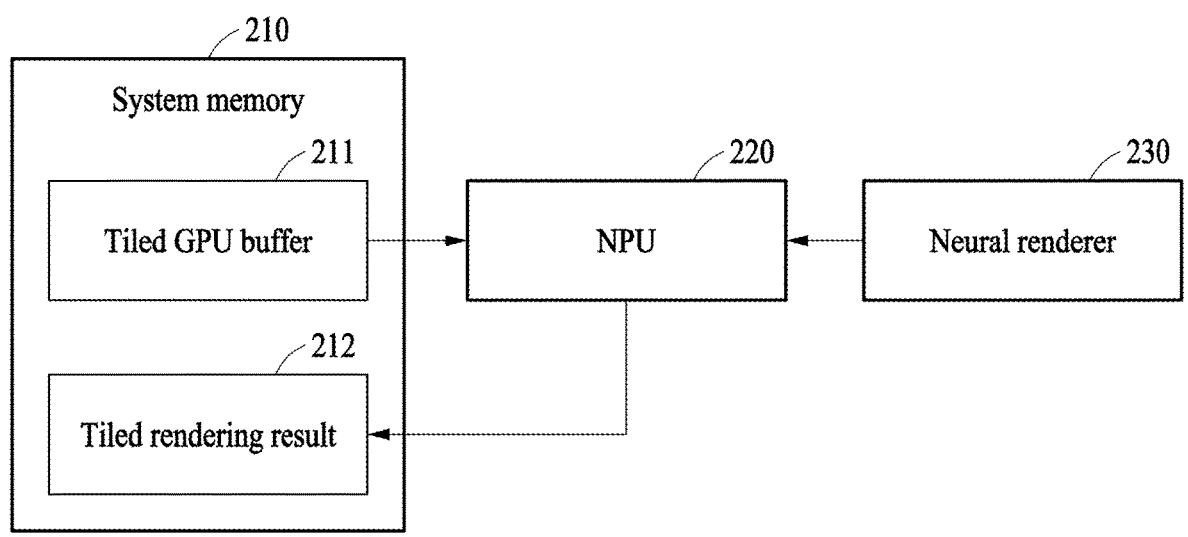
FIG. 2 illustrates an operating environment of a neural processing unit (NPU), according to one or more embodiments.

FIG. 2 illustrates an operating environment of a neural processing unit (NPU), according to one or more embodiments. Referring to FIG. 2, an NPU 220 may receive an intermediate rendering result from a tile-based GPU buffer 211, which may be in a system memory 210 (in units of tiles). The intermediate rendering result may have been generated by the GPU. A tiled rendering result 212 may be generated by performing the second type of rendering operation on the intermediate rendering result. The NPU 220 may transmit the tiled rendering result 212 to the system memory 210. When the tiled rendering result 212 is an intermediate rendering result, the tiled rendering result 212 may be provided to the GPU.

Prior to the rendering operation of the NPU 220, a first processing schedule (order) specific to the first type of rendering operation may be rescheduled (reordered) to a second processing schedule (order) specific to the second type of rendering operation. For example, the first processing schedule may be a schedule for the GPU that is based on image pixel locations, and the second processing schedule may be a schedule for the NPU that is based on weights of the neural network. Assuming, for example, that first to fourth pixels are sequentially positioned in the image frame, first weight data may be used for the first and third pixels, and second weight data may be used for the second and fourth pixels. In this case, the first processing schedule may indicate sequential processing of the first to fourth pixels (in that order) and the second processing schedule may indicate processing in the order of: the first, third, second, and then fourth pixel. If the NPU processes the first to fourth pixels according to the first processing schedule, it may be necessary to load the corresponding weight data four times. However, when the NPU processes the first to fourth pixels according to the second processing schedule, it may be necessary to load the weight data only twice.

A neural renderer 230 may be implemented through an operation of the NPU 220. For example, the neural renderer 230 may be a neural network model such as a neural shading model or a super-resolution imaging model. The neural network model may be trained based on deep learning and then perform inference, according to the training, by mapping input data and output data in a nonlinear relationship to each other. A neural shading model may be trained to perform neural shading and a super-resolution imaging model may be trained to perform the super-resolution imaging.

Figure 3:
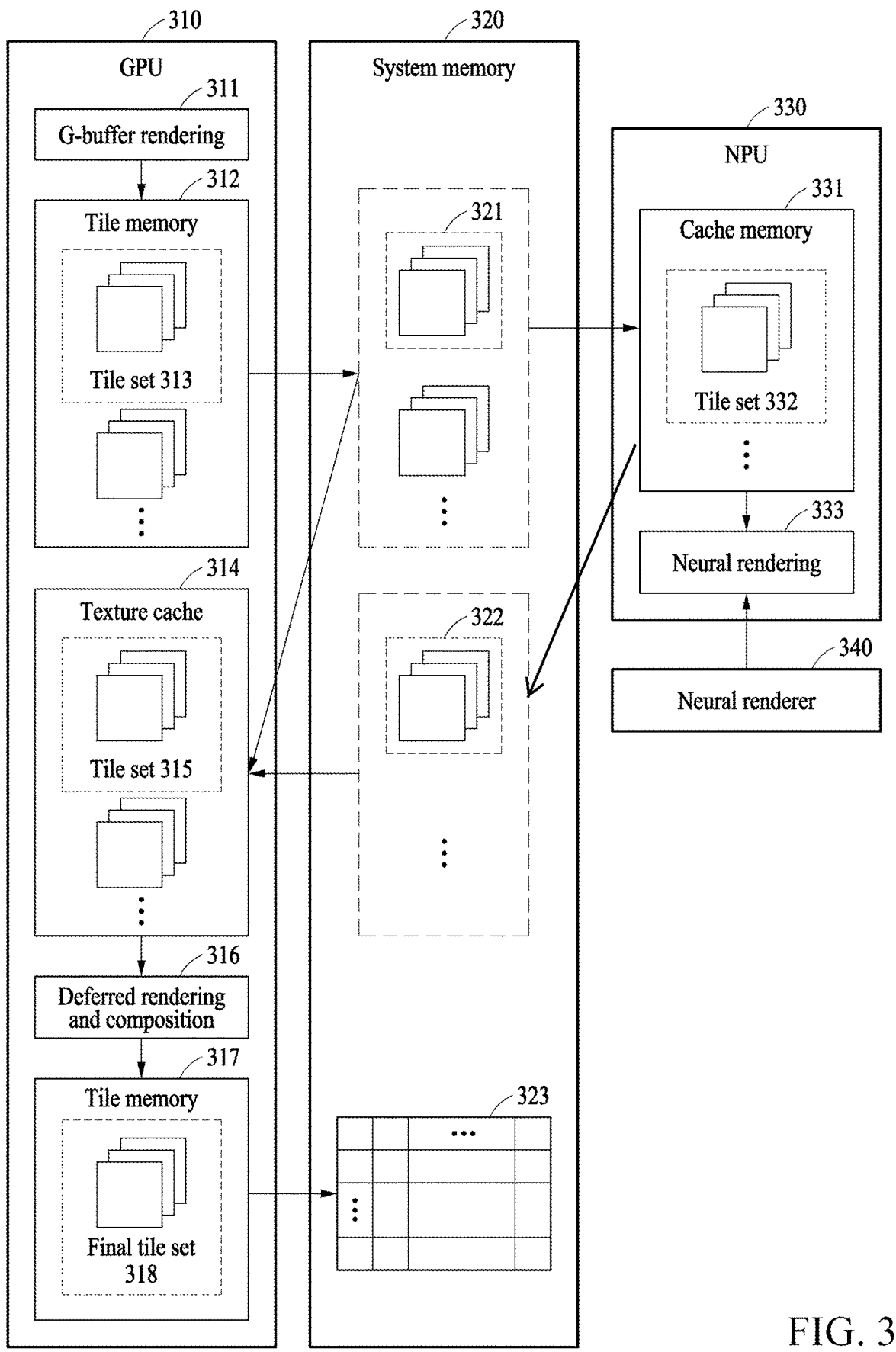
FIG. 3 illustrates processing tile-based image data, according to one or more embodiments.

FIG. 3 illustrates a process of processing tile-based image data, according to one or more embodiments. Referring to FIG. 3, a GPU 310 may generate the first-rendering result corresponding to input graphic data by performing geometry buffer rendering (G-buffer rendering) 311. The G-buffer rendering 311 may use the first type of operation, which may include a scalar operation and/or a vector operation. The GPU 310 may generate the first-rendering result using a memory space of tile memory 312. A tile set 313 in the tile memory 312 may correspond to (e.g., be at least a portion of) the first-rendering result. The GPU 310 may store the tile set 313 in system memory 320 in units of tiles. A tile set 321 may correspond to (e.g., be at least a portion of) the tile set 313.

The NPU 330 may load the tile set 321 in its cache memory 331 in units of tiles and generate the second-rendering result by performing neural rendering 333 in units of tiles. A tile set 332 may correspond to (e.g., be a portion/copy of) the tile set 321. The NPU 330 may implement a neural renderer 340 corresponding to the neural network model through neural rendering 333. The neural rendering 333 may use the second type of operation which may be a matrix operation. For example, the neural rendering 333 may include the neural shading. The NPU 330 may generate the second-rendering result through the cache memory 331 and store the second-rendering result in the system memory 320 in units of tiles. A tile set 322 may correspond to (e.g., be at least a portion of) the second-rendering result.

Tile memories 312, 317 and texture cache 314 may be internal memory of the GPU 310, the cache memory 331 may be internal memory of the NPU 330, and the system memory 320 may be memory external to the GPU 310 and the NPU 330. The external memory may be a memory (or memory unit) that is closest to the GPU or the NPU after the internal memory.

The NPU 330 may selectively perform the second-rendering on only a portion of the first-rendering result. This operating method may reduce or minimize an increase in operations due to the second-rendering. For example, when there is an object that requires a more realistic representation than other objects, the second-rendering may be selectively performed only on that object, for example. For example, when there is a person object and a background object in a scene being rendered, the second-rendering may be selectively performed only on the person object. Accordingly, by the application of the neural rendering 333, the person object may be more realistically expressed. An object for the second-rendering may be predetermined (i.e., determined any time up to the selective rendering). For example, a target for selective second-rendering may be determined according to the type of object, the texture of the object, the category of the object, etc., and such criteria, or other selection criteria, may be determined in advance. A portion of the first-rendering result that corresponds to an object in a predefined category may, based on being in such category, be provided to the NPU 330. Objects for selective second-rendering may be flagged elsewhere or determined based on other criteria, for example available computing time or resources, indicia of such objects being previously second-rendered, etc.

The GPU 310 may load the tile set 322 (corresponding to the second-rendering result) into its the texture cache 314 and may do so in units of tiles. The GPU 310 may generate a final tile set 318 by performing deferred rendering and composition 316 in units of tiles. A tile set 315 may correspond to the second-rendering result. The deferred rendering may include shading, and the tiles of the corresponding relationship may be merged with each other through composition. The deferred rendering and composition 316 may include the first type of operation. A final tile set 318 may be stored in the tile memory 317 in units of tiles. The final tile set 318 may be transmitted to the system memory 320 in units of tiles, and a final rendering result 323 (e.g., final rendering result 103) corresponding to the final tile set 318 may thereby be generated.

Figure 4:
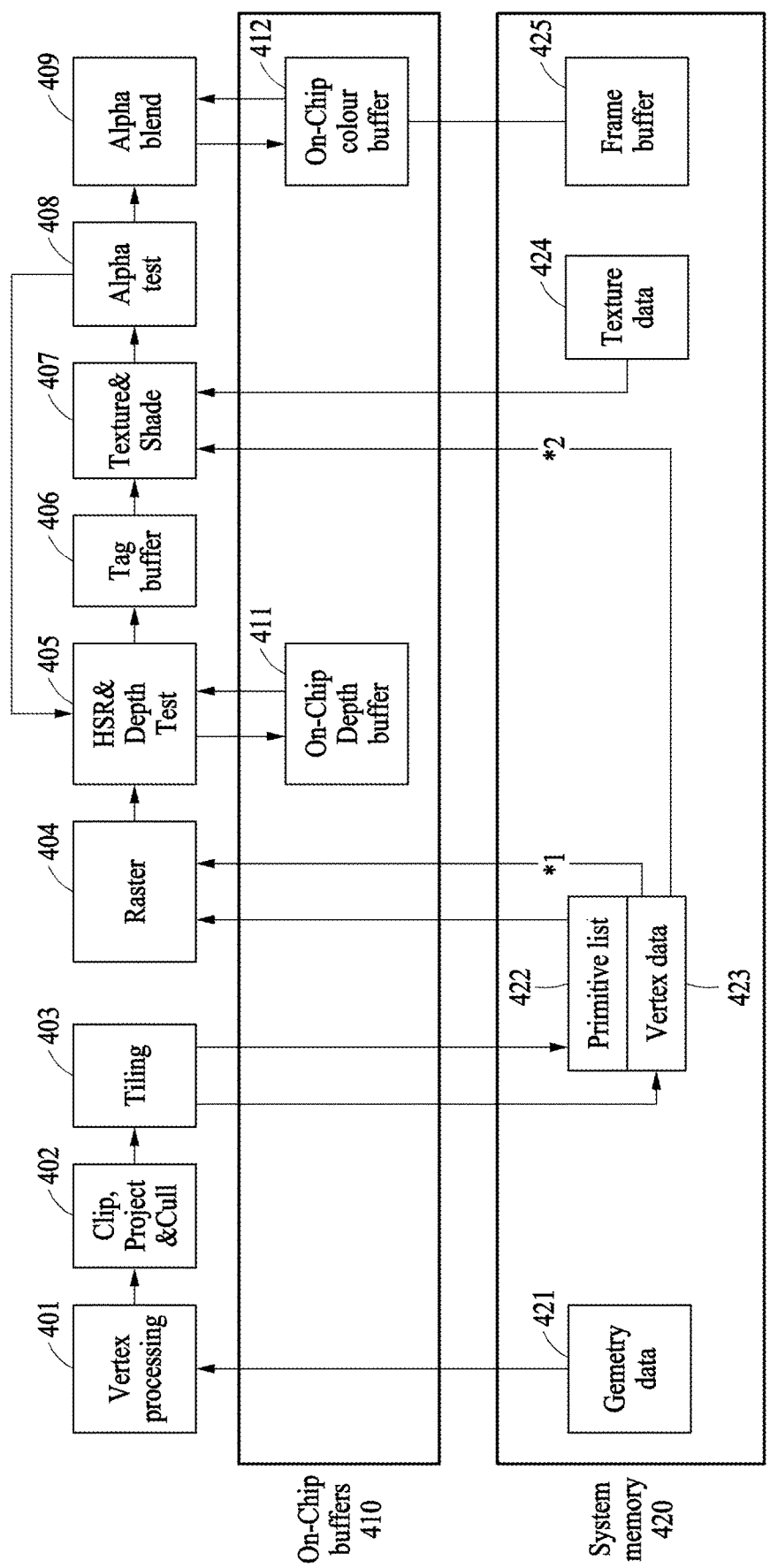
FIG. 4 illustrates an example of tile-based rendering, according to one or more embodiments.

FIG. 4 illustrates an example of tile-based rendering, according to one or more embodiments. The detailed operation of the tile-based rendering of FIG. 4 may constitute one rendering path or pipeline. For example, the detailed operation may include pipeline stages such as a vertex processing stage 401, a clip, project, and cull stage 402, a tiling stage 403, a raster stage 404, a hidden-surface removal (HSR) and depth test stage 405, a tag buffer stage 406, a texture and shade stage 407, an alpha test stage 408, and an alpha blend stage 409. However, FIG. 4 is only one example of the rendering path/pipeline and various rendering paths/pipelines different from FIG. 4 may be formed.

The GPU may implement the example rendering path through on-chip buffers 410 and the system memory 420. The on-chip buffers 410 may be internal memory of the GPU. The GPU may perform the vertex processing stage 401 based on geometry data 421 (e.g., model data) in the system memory 420. The GPU may generate a primitive list 422 and vertex data 423 through the vertex processing stage 401, through the clip, project, and cull stage 402, and through the tiling stage 403. The GPU may store the primitive list 422 and the vertex data 423 in the system memory 420.

The GPU may sequentially perform the raster stage 404 and the remaining operations/stages thereafter. The GPU may perform the raster stage 404 on the primitive list 422 and the vertex data 423, and perform the HSR and the depth test stage 405 through an on-chip depth buffer 411. The GPU may perform the texture and shade stage 407 based on the vertex data 423 and texture data 424, and perform the alpha blend stage 409 through an on-chip color buffer 412 and a frame buffer 425. For example, the rendering process may include several orders of substages, and the GPU may perform a rendering path once per substage of one order. In this case, each detailed operation of the rendering path may be adjusted according to the characteristics of each substage.

Figure 5:
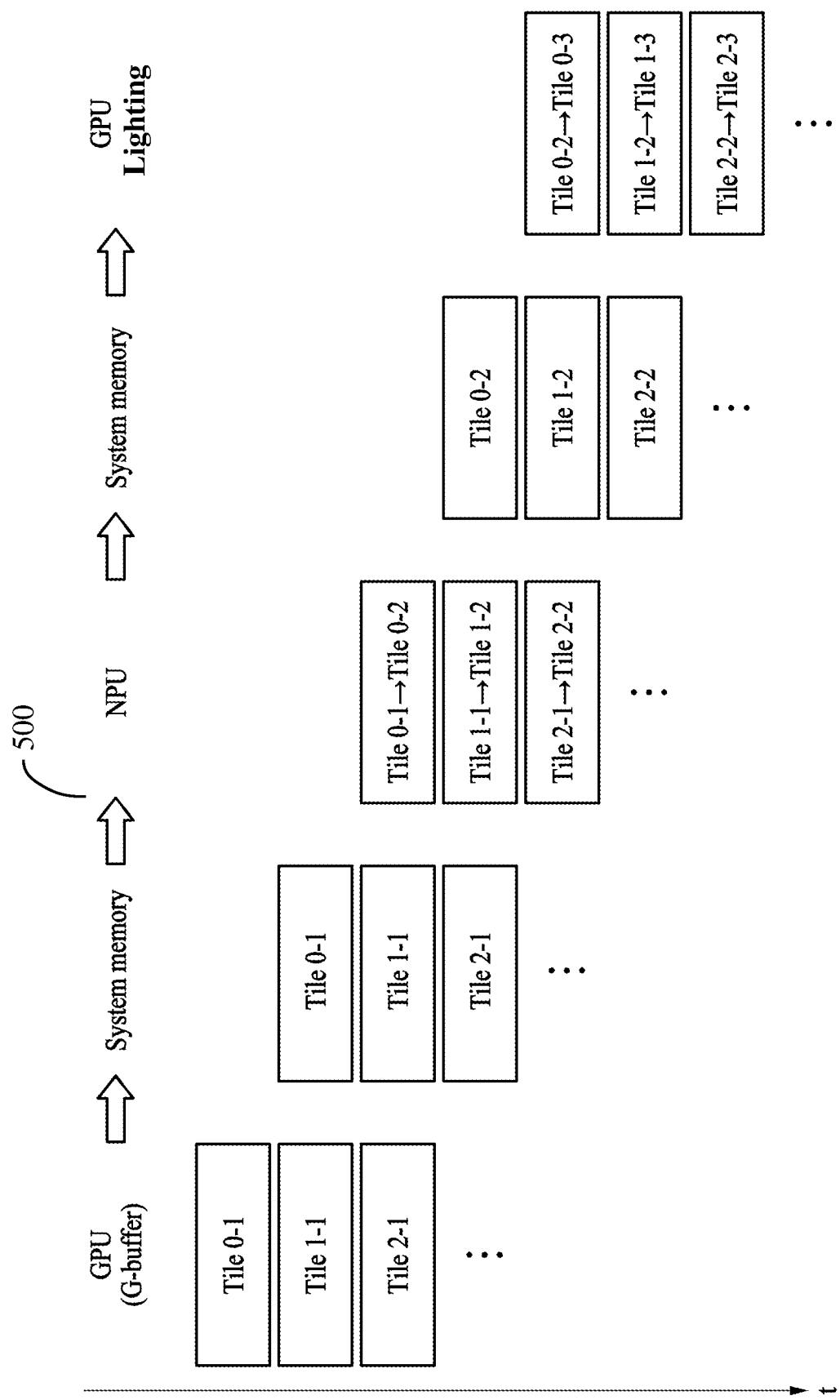
FIG. 5 illustrates a pipelining structure for treating each tile, according to one or more embodiments.

FIG. 5 illustrates a pipelining structure 500 for treating each tile, according to one or more embodiments. Referring to FIG. 5, each tile may be transferred in the order of: the GPU, the system memory, the NPU, the system memory, and the GPU, and the rendering operating for each tile may be performed in at least a part of the transfer process. However, the transfer process of FIG. 5 corresponds to one example, and it is also possible to have a transfer process different from that of FIG. 5. For example, FIG. 5 illustrates an example in which the G-buffer rendering of the GPU, the neural rendering of the NPU, and the shading of the GPU are sequentially performed as, respectively, the first-rendering, the second-rendering, and the third-rendering. Here, the shading of the GPU may correspond to the deferred rendering. Alternatively, even when the first-rendering, the second-rendering, and the third-rendering are performed, the pipeline may be applied.

According to an example embodiment, the pipeline may be applied to the processing of each tile. For example, the generation of the tile units of the first-rendering result according to the G-buffer rendering of the GPU, the storage of each tile of the first-rendering result in the system memory, and the generation of the second-rendering result of NPU for each tile of the first-rendering result may be performed through the pipeline. In this case, before the first-rendering result corresponding to the entire area of the input graphic data is fully generated, the second-rendering result corresponding to a portion (sub-area) of the input graphic data may be generated.

In FIG. 5, each tile has an identifier of x-y, where x may identify a tile and y may identify a rendering order. For example, the identifier 0-1 identifies the first-rendering result for the 0th tile, the identifier 0-2 identifies the second-rendering result for the 0th tile, and the identifier 1-1 identifies the first-rendering result for the 1st tile. When the generation of a first tile of the first-rendering result is completed by the GPU, the generation of a second tile of the first-rendering result may be performed by the GPU while the first tile is stored in the system memory or while the second-rendering result for the first tile is generated by the NPU. For example, the first tile may be the tile 0-1 of FIG. 5 and the second-rendering result for the first tile may be the tile 0-2 of FIG. 5.

When the storage of a given tile in the system memory is completed, an is-available state (or status) of the tile may be known to (e.g., communicated to) the NPU. For example, the is-available state of the first tile may be known/communicated through a transmission of a notification signal for the NPU or a change of a flag indicating the is-available state of the first tile. For example, the flag may have a value of 1 (or 0) in the is-available state and 0 (or 1) in an is-unavailable state. The NPU may perform the second-rendering according to reception of either a notification signal or a flag confirmation. Conversely, when the tile processing of the NPU is completed for a given tile, the is-available state of the tile may be communicated/known to the GPU.

Figure 6:
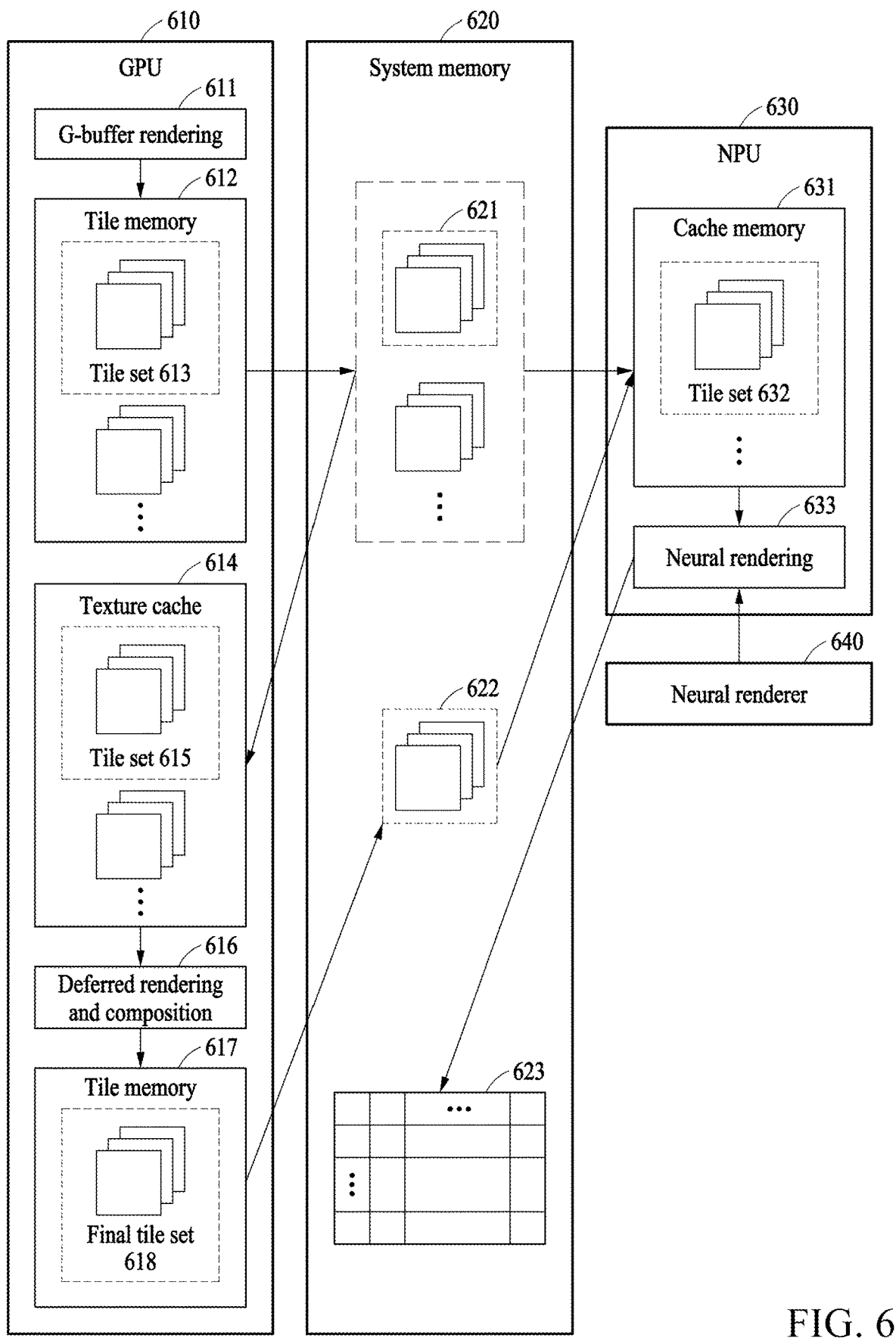
FIG. 6 illustrates processing of tile-based image data, according to one or more embodiments.

FIG. 6 illustrates a process of processing of tile-based image data, according to one or more embodiments. FIG. 6 illustrates the rendering process sequentially performing the G-buffer rendering by the GPU, the neural rendering by the NPU, and the deferred rendering by the GPU. FIG. 6 also illustrates the rendering process sequentially performing the G-buffer rendering by the GPU, the deferred rendering by the GPU, and the neural rendering by the NPU Referring to FIG. 6, a GPU 610 may generate the intermediate rendering result corresponding to the input graphic data by performing G-buffer rendering 611. The G-buffer rendering 611 may be based on (performed by) the first type of operation, which may include a scalar operation and/or a vector operation. The GPU 610 may generate the intermediate rendering result and store the intermediate rendering result in a local memory space, e.g., a tile memory 612 (not necessarily all at once). A tile set 613 in the tile memory 612 may correspond to (e.g., be at least a portion of) the intermediate rendering result. The GPU 610 may store the tile set 613 in system memory 620 in units of tiles. A tile set 621 may correspond to (be at least a portion of) the tile set 613.

The GPU 610 may load the tile set 613 (corresponding to at least a portion of the intermediate rendering result) into its texture cache 614 in units of tiles and may generate a final tile set 618 by performing deferred rendering and composition 616 in units of tiles. The final tile set 618 may correspond to (be at least a portion of) the first-rendering result. In some embodiments, the tile memory 612 and the texture cache 614 are integrated and the tile set 613 may be directly used for the deferred rendering and composition 616 without going through the system memory 620. The deferred rendering and composition 616 may be based on the first type of operation. The final tile set 618 may be stored in the GPU's tile memory 617 in units of tiles. The final tile set 618 may be transmitted to the system memory 620 in units of tiles. A tile set 622 may correspond to the final tile set 618.

An NPU 630 may load the tile set 622 in cache memory 631 in units of tiles and generate the second-rendering result by performing neural rendering 633 in units of tiles (e.g., rendering first tiles of the first-rendering result to respective second tiles of the second-rendering result). A tile set 632 may correspond to the tile set 622. The NPU 630 may implement a neural renderer 640 (a neural network model) through neural rendering 633. The neural rendering 633 may be include the second type of operation, e.g., a matrix operation. For example, the neural rendering 633 may include super-resolution imaging. The NPU 630 may use the intermediate rendering result of the GPU 610 for the neural rendering 633 as necessary. For example, the NPU 630 may perform the neural rendering 633 using the tile set 621 and/or the image frame corresponding to the tile set 621. The NPU 630 may generate the second-rendering result through the cache memory 631 and store the second-rendering result in the system memory 620 in units of tiles. A final rendering result 623 may be determined based on the second-rendering result.

Figure 7:
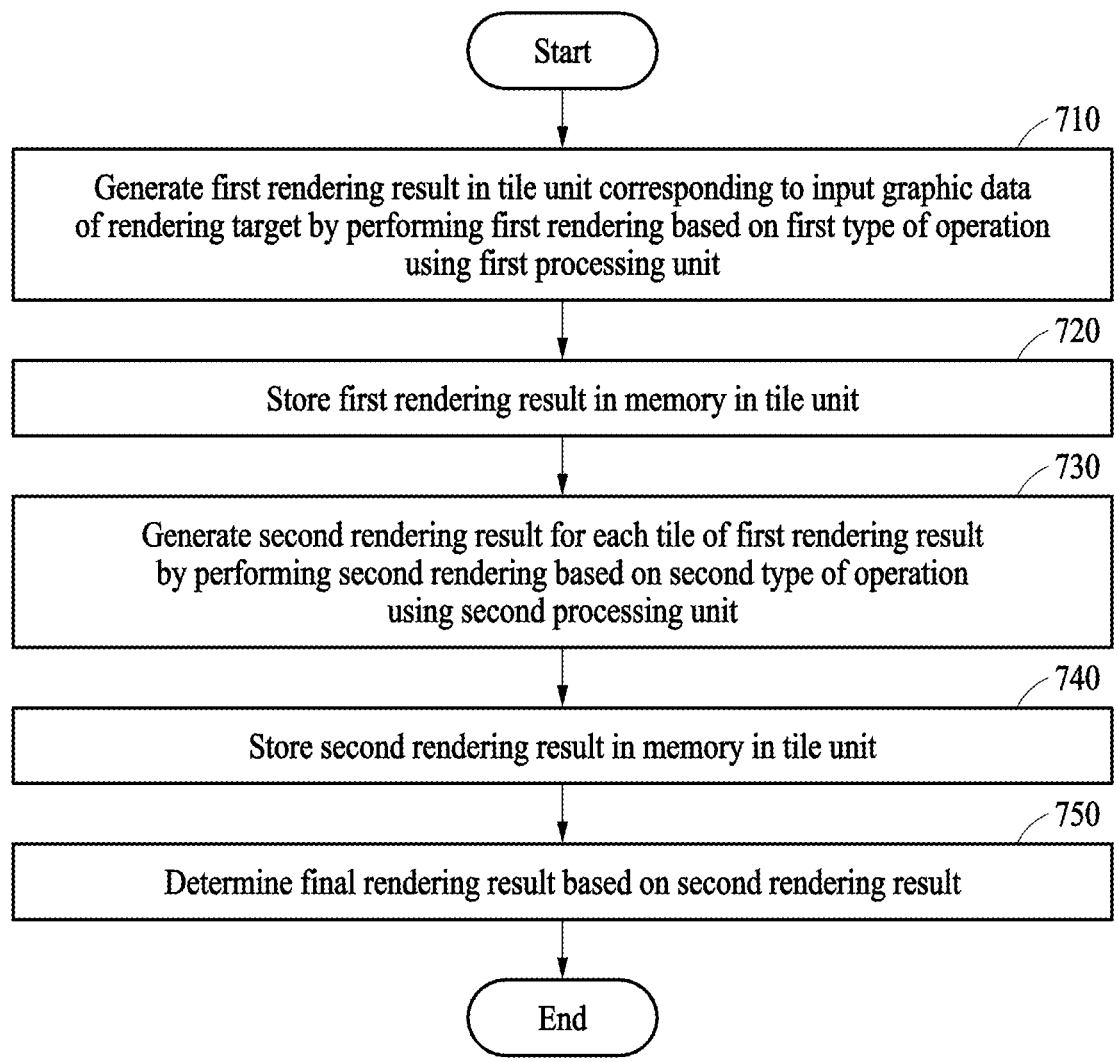
FIG. 7 illustrates a method for image rendering, according to one or more embodiments.

FIG. 7 illustrates a method for image rendering, according to one or more embodiments. Referring to FIG. 7, in step 710, the image rendering apparatus may generate the first-rendering result corresponding to input graphic data (of a rendering target) in units of tiles by performing the first-rendering based on the first type of operation using the first processing unit. In step 720, the image rendering apparatus may store the first-rendering result in the memory in units of tiles. In step 730, the image rendering apparatus may generate the second-rendering result for each tile of the first-rendering result by performing the second-rendering based on the second type of operation using the second processing unit. In step 740, the image rendering apparatus may store the second-rendering result in the memory in units of tiles. In step 750, the image rendering apparatus may determine a final rendering result based on the second-rendering result.

The first type of operation may include a scalar operation and/or a vector operation and the second type of operation may include a matrix operation. The first processing unit may have a structure (e.g., circuit) specialized in the first type of operation and the second processing unit may have a structure (e.g., circuit) specialized in the second type of operation.

Prior to the second-rendering using the second processing unit, a first processing schedule/order specific to the first type of operation may be rescheduled (reordered) to a second processing schedule/order that is specific to (e.g., optimal for) the second type of operation. The first processing unit may be the GPU, the second processing unit may be the NPU, the first processing schedule/order may be a schedule/order based on image pixel locations, and the second processing schedule may be a schedule/order based on weight(s) of the neural network.

The first-rendering may include geometric buffer rendering that converts the input graphic data into the first-rendering result (in first tiles) based on vertices of the input graphic data and the deferred rendering that performs shading for each first tile of the first-rendering result, and the second-rendering may include super-resolution imaging that increases the resolution of the first-rendering result (e.g., renders the first tile units to respective higher-resolution second tile units).

The rendering apparatus may generate the third-rendering result for each tile (second tiles) of the second-rendering result by performing third-rendering with the first type of operation using the first processing unit, may store the third-rendering result (third tiles) in the memory, and may determine the final rendering result based on the third-rendering result. In this case, the first-rendering may include the geometry buffer rendering that converts the input graphic data into the first-rendering result of the tile unit based on the vertices of the input graphic data, the second-rendering may include the neural shading that performs shading for each tile of the first-rendering result using the neural network model, and the third-rendering may include the deferred rendering that performs shading for each tile of the second-rendering result.

Through the use of a tile-based pipeline architecture, generation of a tile unit of the first-rendering result, a storage of each tile of the first-rendering result in the memory, and the second-rendering result corresponding to some area of the input graphic data may be generated before the first-rendering result corresponding to the entire area of the input graphic data is fully generated.

When the generation of a first tile of the first-rendering result is completed by the first processing unit, the generation of a second of the first-rendering result may be performed by the first processing unit while the first tile is stored in the memory or while the second-rendering result for the first tile is generated by the second processing unit. When the storage of the first tile in the memory is completed, the is-available state/status of the first tile may be known/communicated to the second processing unit; the is-available state of the first tile may be provided through either a transmission of a notification signal for the second processing unit or through a change of a flag indicating the is-available state of the first tile. When the generation of the second-rendering result for the first tile is completed by the second processing unit and when the storage of such second-rendering result for the first tile in the memory is completed, the is-available state of the second-rendering result for the first tile may be communicated/provided to the first processing unit; the is-available state of the second-rendering result for the first tile may be provided through a transmission of a notification signal for the first processing unit or a change of a flag indicating the is-available state of the second-rendering result for the first tile.

The descriptions of FIGS. 1 through 6, 8, and 9 may be applied to the methods for image rendering.

Figure 8:
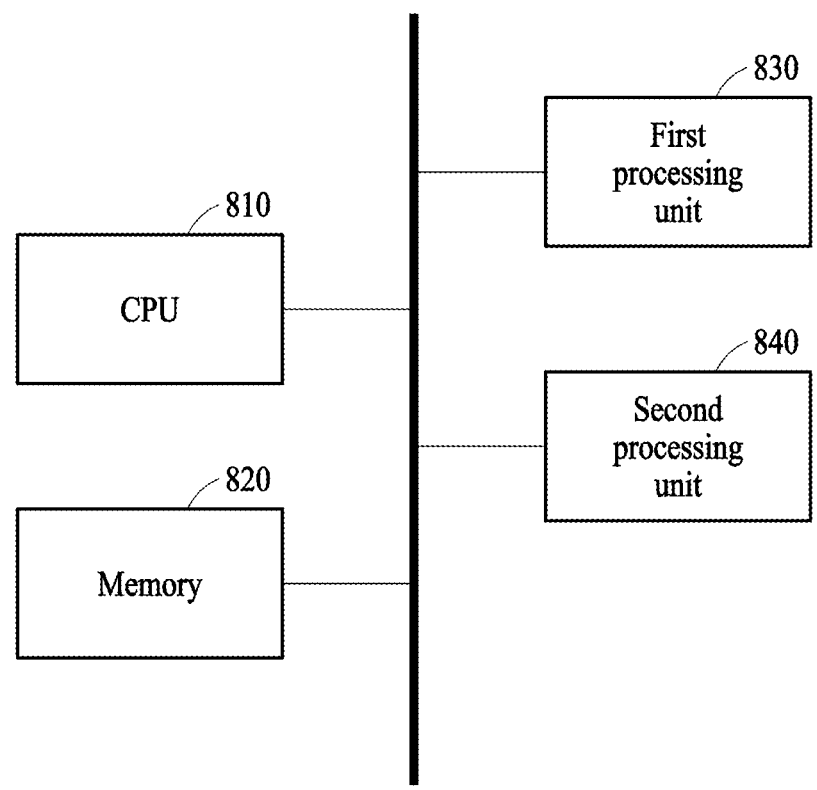
FIG. 8 illustrates a rendering apparatus, according to one or more embodiments.

FIG. 8 illustrates a rendering apparatus, according to one or more embodiments. Referring to FIG. 8, the rendering apparatus may include a centralized processing unit (CPU) 810, memory 820, a first processing unit 830, and a second processing unit 840. The CPU 810 may control the memory 820, the first processing unit 830, and the second processing unit 840 and serve to receive data from an external configuration of the rendering apparatus or to transmit the data to an external configuration of the rendering apparatus. The first processing unit 830 may perform the first type of operation, the second processing unit 840 may perform the second type of operation, and the rendering result may be derived through the first type of operation and the second type of operation. The memory 820 may be involved in data transfer between the first processing unit 830 and the second processing unit 840. An interface capable of transmitting data of the tile unit between the first processing unit 830, the memory 820, and the second processing unit 840 may be included. For example, a tile transfer interface may be provided between the first processing unit 830 and the memory 820 and between the second processing unit 840 and the memory 820. Through this interface, the rendering result of each stage may be transferred in units of tiles. In addition, the descriptions of FIGS. 1 through 7 and 9 may be applied to the rendering apparatus.

Figure 9:
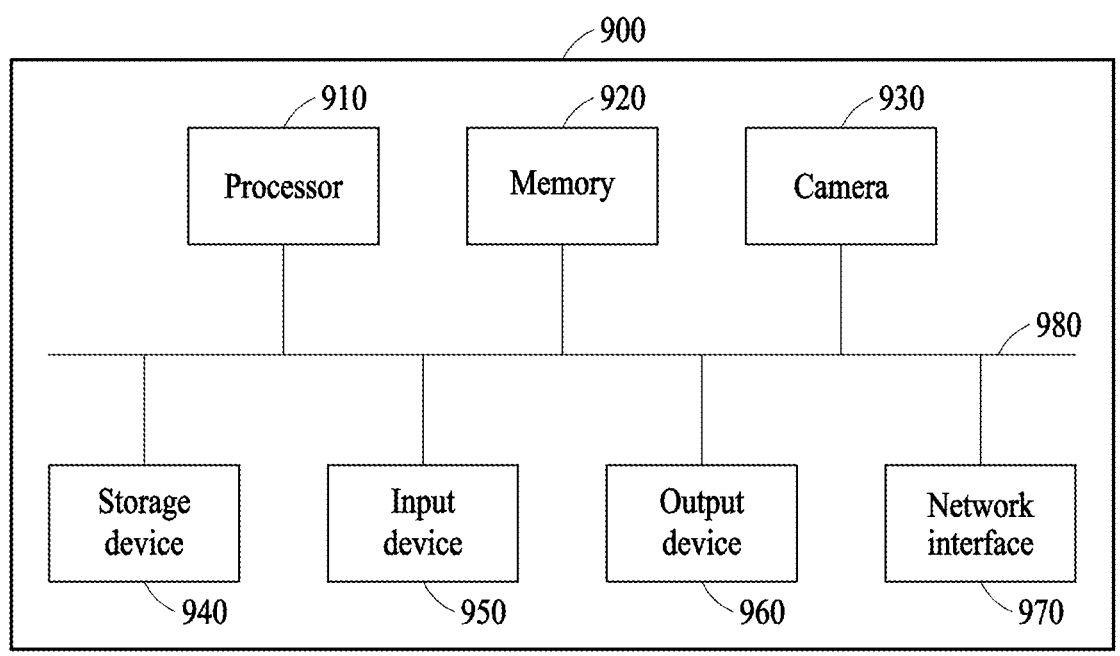
FIG. 9 illustrates an electronic device, according to one or more embodiments.

FIG. 9 illustrates an electronic device, according to one or more embodiments. Referring to FIG. 9, an electronic device 900 may include a processor 910, memory 920, a camera 930, a storage device 940, an input device 950, an output device 960, and a network interface 970, and they may communicate with each other through a communication bus 980. For example, the electronic device 900 may be, or may be implemented as at least a part of, a mobile device such as a mobile phone, a smartphone, a personal digital assistant (PDA), a netbook, a tablet computer, a laptop computer, and the like; a wearable device such as a smartwatch, a smart band, smart glasses, and the like; a computing device such as a desktop, a server, and the like; a home appliance such as a television, a smart television, a refrigerator, and the like; a security device such as a door lock and the like; and vehicles such as an autonomous vehicle, a smart vehicle, and the like. The electronic device 900 may structurally and/or functionally include the rendering apparatus 100 of FIG. 1 and/or the rendering apparatus of FIG. 8.

The processor 910 may execute instructions and functions in the electronic apparatus 900. For example, the processor 910 may process instructions stored in the memory 920 or the storage device 940. The processor 910 may perform at least one of the operations described above with reference to FIGS. 1 through 8. The processor 910 may include one or more of the CPU, the GPU, and the NPU. The memory 920 may include a non-transitory computer-readable storage medium or a non-transitory computer-readable storage device (not signals per se). The memory 920 may store instructions that are to be executed by the processor 910, and also store information associated with software and/or applications when the software and/or applications are being executed by the electronic apparatus 900.

The camera 930 may capture a photo and/or a video. The storage device 940 may include a non-transitory computer-readable storage medium or a non-transitory computer-readable storage device. The storage device 940 may store a greater amount of information than the memory 920 and store the information for a long period of time. For example, the storage device 940 may include magnetic hard disks, optical disks, flash memories, floppy disks, or other forms of non-volatile memories known in the art.

The input device 950 may receive an input from a user through a traditional input scheme using a keyboard and a mouse, and through a new input scheme such as a touch input, a voice input and/or an image input. For example, the input device 950 may detect an input from a keyboard, a mouse, a touchscreen, a microphone, or the like, and may include any other device configured to transfer the detected input to the electronic apparatus 900. The output device 960 may provide a user with an output of the electronic apparatus 900 through a visual channel, an auditory channel, or a tactile channel. The output device 960 may include, for example, a display, a touchscreen, a speaker, a vibration generator, or any other device configured to provide a user with the output. The network interface 970 may communicate with an external device via a wired or wireless network.

The computing apparatuses, the electronic devices, the processors, the memories, the displays, the information output system and hardware, the storage devices, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method comprising:
   generating a plurality of first tiles as a first-rendering result by performing, using a first processor, first-rendering comprising a first type of operation on input graphic data of a rendering target where a frame of the input graphic data is divided into tiles and the tiles are processed tile by tile to generate the plurality of first tiles;

storing, in memory, the plurality of first tiles of the first-rendering result;

generating a plurality of second tiles as a second-rendering result by performing, using a second processor, second-rendering comprising a second type of operation different than the first type of operation, on the plurality of first tiles of the first-rendering result where each first tile is processed to generate corresponding second tile in the second-rendering result;

storing, in the memory, the plurality of second tiles of the second-rendering result, wherein the first type of operation comprises a scalar operation or a vector operation, and wherein the second type of operation comprises a matrix operation.

2. The method of claim 1,
wherein the
second processor comprising a neural network model to implement the second type of operation.

3. The method of claim 1, further comprising:
prior to the generating of the second-rendering result using the second processor, reordering a first processing schedule for performing the first type of operation to a second processing schedule for performing the second type of operation.

4. The method of claim 3,
wherein the first processor is a graphic processing unit (GPU),
wherein the second processor is a neural processing unit (NPU),
wherein the first processing schedule is a schedule based on image pixel locations, and
wherein the second processing schedule is based on one or more weights of a neural network implemented by the NPU.

5. The method of claim 1, wherein the generating of the first-rendering result comprises:
geometry-buffer rendering that converts the input graphic data into the first tiles based on vertices of the input graphic data; and
deferred rendering that performs shading for each first tile of the first-rendering result,
wherein the generating of the second-rendering result comprises super-resolution imaging that increases the resolution of the first tiles of the first-rendering result.

6. The method of claim 1, further comprising:
generating a third-rendering result for each second tile of the second-rendering result by performing third-rendering comprising the first type of operation using the first processor; and
storing the third-rendering result in the memory,
wherein the determining of the final rendering result is further based on the third-rendering result.

7. The method of claim 6, wherein the generating of the first-rendering result comprises geometry buffer rendering that converts the input graphic data into the plurality of first tiles of the first-rendering result based on vertices of the input graphic data,
wherein the generating of the second-rendering result comprises neural shading that performs shading for each first tile of the first-rendering result using a neural network model, and wherein the generating of the third-rendering result comprises deferred rendering that performs shading for each second tile of the second-rendering result.

8. The method of claim 1, wherein the generation of the first-rendering result, the storing of the first-rendering result in the memory, and the generating of the second-rendering result for each first tile of the first-rendering result are performed through a pipeline; and
wherein a portion of the second-rendering result corresponding to a sub-area of the input graphic data is generated before the first-rendering result corresponding to entirety of the input graphic data is generated.

9. The method of claim 1, wherein a second of the first tiles is generated by the first processor when a generation of a first of the first tiles is completed by the first processor, while the first of the first tiles is stored in the memory or the second-rendering result for the first of the first tiles is generated by the second processor.

10. The method of claim 9, wherein an indication of an is-available status of the first of the first tiles is received by the second processor when the storage of the first of the first tiles in the memory is completed; and
wherein the is-available status of the first of the first tiles is received through either a transmission of a notification signal for the second processor or a change of a flag indicating the is-available status of the first of the first tiles.

11. The method of claim 9, wherein an indication of an is-available status of the second-rendering result for the first of the first tiles is received by the first processor when a generation of the second-rendering result for the first of the first tiles is completed by the second processor and when a storage of the second-rendering result for the first of the first tiles in the memory is completed; and
wherein the is-available status of the second-rendering result for the first of the first tiles is received through either a transmission of a notification signal for the first processor or a change of a flag indicating the is-available status of the second-rendering result for the first of the first tiles.

12. A non-transitory computer-readable storage medium storing instructions that, when executed by a processor, cause the processor to perform the method of claim 1.

13. The method of claim 1, wherein the second processor is a neural processing unit (NPU).

14. An apparatus comprising:
a first processor and a second processor configured to execute instructions;
a memory storing the instructions, which when executed by the first processor configured the first processor to:
generate a plurality of first tiles as a first-rendering result by performing first-rendering comprising a first type of operation on input graphic data of a rendering object where a frame of the input graphic data is divided into tiles and the tiles are processed tile by tile to generate the plurality of first tiles, and store the plurality of first tiles in memory;
the memory, when executed by the second processor configured the second processor to generate a plurality of second tiles as a second-rendering result by performing second-rendering comprising a second type of operation different than the first type of operation on the plurality of first tiles, where each first tile is processed to generate corresponding second tile in the second-rendering result and store the second tiles in the memory;

wherein the first type of operation comprises a scalar operation or a vector operation; and wherein the second type of operation comprises a matrix operation.

15. The apparatus of claim 14,
wherein the apparatus comprises a pipeline comprising the first processor and the second processor,
wherein the generation of the first-rendering result, the storage of the plurality of first tiles of the first-rendering result in the memory, and the generation of the second-rendering result are performed through the pipeline, and
wherein a portion of the second-rendering result corresponding to a sub-area of the input graphic data is generated before the first-rendering result corresponding to entirety of the input graphic data is generated.

16. The apparatus of claim 14, wherein a first-rendering order for performing the first type of operation is reordered to a second-rendering order for performing the second type of operation, wherein the reordering is performed prior to the generation of the second-rendering result by the second processor.

17. A mobile device comprising:
a first processor and a second processor configured to execute instructions:
a memory storing the instructions, which when executed by the first processor configured the first processor to perform tile-based rendering to generate a plurality of first tiles as a first-rendering result by performing a first-rendering comprising a first type of operation on input graphic data of a rendering target where a frame of the input graphic data is divided into tiles and the tiles are processed tile by tile to generate the plurality of first tiles, and store the plurality of first tiles of the first-rending result in memory;

the memory, when executed by the second processor configured the second processor to generate a plurality of second tiles as a second-rendering result by performing a second-rendering comprising a second type of operation different that the first type of operation, on the plurality of first tiles of the first-rendering result where each first tile is processed to generate corresponding second tile in the second-rendering result, and store the plurality of second tiles of the second-rendering result in the memory;

wherein the first type of operation comprises a scalar operation or a vector operation; and wherein the second type of operation comprises a matrix operation.

18. The mobile device of claim 17, wherein the first tiles and second tiles are generated through a pipeline such that a first tile is being generated while a second tile is being generated; and
wherein a portion of the second tiles that correspond to a sub-area of the input graphic data is generated before all of the first-rendering result corresponding to entirety of the input graphic data is generated.

19. The mobile device of claim 17, wherein generation of a second of the first tiles is performed by the first processor when generation of a corresponding first of the first tiles is completed, while the first of the first tiles is stored in the memory or a corresponding one of the second tiles is generated by the second processor.

20. The mobile device of claim 17, wherein a first processing schedule specific to the first type of operation is reordered to a second processing schedule specific to the second type of operation before the second-rendering by the second processor.

* * * * *